United States Patent [19]

Yaeda et al.

[11] 3,930,107

[45] Dec. 30, 1975

[54] PELLETIZED UNVULCANIZED RUBBERY POLYMER

[75] Inventors: Yasuyuki Yaeda; Shigeki Hayashi; Kazuo Kimura, all of Yokkaichi, Japan

[73] Assignee: Japan Synthetic Rubber Company Limited, Tokyo, Japan

[22] Filed: Dec. 20, 1973

[21] Appl. No.: 426,499

[30] Foreign Application Priority Data

Dec. 30, 1972 Japan.................................. 48-2352

[52] U.S. Cl. ................ 428/407; 427/242; 427/350; 427/385
[51] Int. Cl.² .......................................... B32B 25/16
[58] Field of Search......... 117/100 C, 139; 260/894, 260/5; 427/385, 350, 242; 428/407

[56] References Cited

UNITED STATES PATENTS

| 3,522,332 | 7/1970 | Schikawa............................ 260/94.3 |
| 3,669,722 | 6/1972 | Bishop............................ 117/139 X |
| 3,696,062 | 10/1972 | Lesage et al............................ 260/5 |

*Primary Examiner*—William D. Martin
*Assistant Examiner*—Dennis C. Konopacki
*Attorney, Agent, or Firm*—Toren, McGeady and Stanger

[57] ABSTRACT

Pelletized unvulcanized rubbery polymer comprising pellet cores of unvulcanized rubbery polymer and a coating layer formed thereon, said coating layer consisting of a 1,2-polybutadiene having a 1,2-addition unit content of not less than 70%, crystallinity of not less than 10%, and an intrinsic viscosity $[\eta]$ (as measured in toluene at 30°C) of not less than 0.7 dl/g.

9 Claims, No Drawings

3,930,107

PELLETIZED UNVULCANIZED RUBBERY POLYMER

BACKGROUND OF THE INVENTION

1. Field of the Invention

This invention relates to pelletized unvulcanized rubbery polymer, and more specifically to such material in the form of pellets which consists of unvulcanized rubber or the like coated with polybutadiene having a 1,2-addition unit content of 70% or higher (hereinafter called "1,2-polybutadiene"). The product is adapted for packaging, storage, and transportation in a very effective, streamlined way, can be accurately and quickly weighed or automatically metered in use, lending itself to the continuous and automatic operation of processes, and, moreover, exhibits desirable physical properties as such.

2. Description of the Prior Art

Unvulcanized rubber used in commerce is in most cases available in bales, which must be cut into pieces of desired size before use. The cutting step requires much labor and time and has thereby offered a major obstacle in use in continuous processes, such as, automatic metering. This is a problem of particular importance today when efforts are being made to reduce the labor requirements in every sector of industry.

Although some attempts have been made to form pellets directly from unvulcanized rubber, none have been commercially successful because of the stickiness of the rubber which causes problems while in storage or in transit.

With the view to overcoming the foregoing difficulties of unvulcanized rubber, we have studied the possibility of pelletizing unvulcanized rubber and the like which are free of those troubles.

First, pellets were formed by coating the fine chips of unvulcanized rubber with a thermoplastic resin commonly in use, e.g., polyethylene, polyvinyl chloride or vinyl acetate-vinyl chloride copolymer. The pellets thus obtained were very convenient to handle but posed the following unexpected problems.

Recent tendencies in the rubber industry are such that, in order to save labor in the process of milling, automatization is being used more and more and the milling time, with a Banbury mixer, is being decreased. Under these operating conditions, polyethylene and the like with which have high melting glass transition points, when used for the coating purpose, tend to remain partly unmelted in the end product of the vulcanized rubber. When the residual unmelted content is excessive and the product has dynamic fatigue, separation occurs in the portion where the polyethylene or the like remains. Furthermore said excess residual content imparts unfavorable effects upon the physical properties of the rubber, whether vulcanized or not, before the product suffers from the fatigue. These possibilities make the use of ordinary thermoplastic resins unpractical.

SUMMARY OF THE INVENTION

Therefore, as the result of further examination, the present inventors that, when using a certain specific 1,2-polybutadiene instead of synthetic resin, the grains thus obtained were not only excellent with respect to handling, but also, did not show any adverse influences on green strength and extrusion as a characteristic of its unvulcanized rubber state. Nor were adverse effects on the scorching time and vulcanization rate observed. At the same time, while polyethylene tended to have a bad influence on the physical properties, such as tearstrength and cut gross, 1,2-PBD did not harm the physical properties. Based on this discovery, the inventors have succeeded in effecting the present invention.

DESCRIPTION OF THE PREFERRED EMBODIMENT

Thus, according to this invention, pellets of unvulcanized rubbery polymer are provided which comprise cores of pellets consisting of unvulcanized rubbery polymer have a coating layer of 1,2-polybutadiene having a 1,2-addition unit content of not less than 70%, crystallinity of not less than 10%, and intrinsic viscosity $[\eta]$ of not less than 0.7 dl/g (as measured in toluene at 30°C).

The 1,2-polybutadiene to form a coating layer for the pellets of the invention has a 1,2-addition unit content of not less than 70%, preferably not less than 85%. If the 1,2-addition unit content is less than 70%, the 1,2-polybutadiene will have a poor film-forming ability and satisfactory pellets will not result.

The crystallinity is not less than 10%, preferably not less than 15% and preferably between 20 and 35%.

A crystallinity of less than 10% will increase the tackiness of the 1,2-polybutadiene and the resulting pellets will become too sticky to handle and will render it impossible to realize the object of the invention.

The intrinsic viscosity $[\eta]$ (in toluene at 30°C) is 0.7 dl/g or higher, particularly preferably 1.0 dl/g or higher. A lower intrinsic viscosity will affect the film-forming ability of the coating material in the manufacture of pellets, and will make the pellets difficult to handle.

The 1,2-polybutadiene to be used in the present invention may be prepared by any known processes, for example, those discloses by U.S. Pat. Nos. 3,498,963 and 3,522,332.

There is no particular limitation to the type of unvulcanized rubbery polymer to be used as cores for the pellets of the invention, and a wide variety of unvulcanized rubbery polymer may be employed. Typical examples are natural and synthetic rubbers including styrene-butadiene rubber (SBR), acrylonitrile-butadiene rubber (NBR), polybutadiene-rubber (BR), polyisoprene rubber (IR), polychloroprene rubber (CR), butyl rubber (IIR), and ethylene-propylene-diene terpolymer rubber (EPDM). These may be used singly or in combination of two or more.

It is, of course, possible to add the common compounding ingredients, such as reinforcing agents, fillers, extender oils, pigments, vulcanizing agents, vulcanization accelerators, vulcanization activators, antioxants, perfume, and/or softener, to either the 1,2-polybutadiene or the unvulcanized rubbery polymer or both.

For the purpose of the invention, pelletizing may be accomplished by any known method. Desirable methods are, for example, by the use of a coating die which is conventionally used in the art, by the dipping of unvulcanized rubber chips in a solution of 1,2-polybutadiene and subsequent removal of the solvent or by coating of unvulcanized rubber chips with a 1,2-polybutadiene solution by means of a spray gun and subsequent solvent removal.

Of the resin-coating methods mentioned above, those employing a solution are not applicable to resins such as, polyethylene which have low solubility.

The pellets are not limited in size but those ranging in diameter from about 0.1 to about 30 mm usually give good results.

The thickness of the coating layer is not critical, either, but may be suitably chosen depending upon the intended use of the pellets and other factors. Usually it may vary from 3 to 200 $\mu$. The coating need not always be continuous but has only to cover the unvulcanized rubber to such an extent as to avoid sticking between the pellets.

The unvulcanized rubbery polymer pelletized in accordance with the present invention is of very great commercial value because of the pelletizing not only achieves a great labor-saving effect but also produces no adverse effects on the scorching time, the vulcanization rate, and the physical properties of the unvulcanized rubber as well as the vulcanized rubber produced therefrom.

The pelletizing process of the invention and the physical properties of the compounded rubbers made of the pellets will be understood more easily by reference to the following examples; however, these examples are intended to illustrate the invention and are not to be construed to limit the scope of the invention.

In the examples, the microstructure of 1,2-polybutadiene was measured by D. Morero et al.'s infrared absorption analysis [Chim. e. Ind., 41, 758 (1959)]. The crystallinity was measured by the Density measurement method. The density of 1,2-polybutadiene with 100% crystallinity was assumed to be 0.963 according to the measurement method of G. Natta ]J. Polymer Sco., 20, 25 (1956)], and that of 1,2-polybutadiene with zero crystallinity was assumed to be 0.892, and the density confirmed to be amorphous by X-ray diffraction (U.S. Pat. No. 3,498,963).

Unless otherwise specified, quantities in the examples are expressed as parts by weight.

EXAMPLE 1

Oil-extended SBR (a product of Japan Synthetic Rubber Co. sold under the trade name "JSR 1707") was extruded in the form of rods by a rubber extruder, and the rods were cut into generally spherical rubber pellets about 8 mm in diameter. The rubber pellets were dipped in an n-hexane solution containing 10% by weight 1,2-polybutadiene having a 1,2 -addition unit content of 93%, crystallinity of 25%, and intrinsic viscosity $[\eta]_{toluene}^{30°C}$ of 1.5 dl/g, and then dried at 50°C under reduced pressure. The 1,2-polybutadiene-coated rubber pellets thus obtained, with a coating thickness of about 20$\mu$, was analyzed and found to contain about 1.5% by weight 1,2-polybutadiene on the basis of the total rubber weight.

The rubber pellets and those which had been coated in the same way or not coated at all with 1,2-polybutadienes having the same 1,2-addition unit content and intrinsic viscosity as the one described above but with varying crystallinity values 0% and 15%, were packed in 50 cm-deep containers and allowed to stand at ordinary temperature for 10 days. Thereafter, the rubber pellet samples were taken out and examined for the degrees of sticking. The sample lots not coated with 1,2-polybutadiene or coated with 1,2-polybutadiene having no crystallinity had gathered and stuck together into unseparable masses. The pellets coated with the 1,2-polytadiene having a crystallinity of 15% could be readily loosened by hand into individual pieces. Those coated with the 1,2-polybutadiene with 25% crystallinity indicated no sign of sticking.

When the above-described experiment was repeated this time with a 1,2-polybutadiene having a 1,2-addition unit content of 92%, crystallinity of 25%, and intrinsic viscosity $[\eta]_{toluene}^{30°C}$ of 0.5 dl/g, the resulting pellets were found to be as sticky as those not coated with 1,2-polybutadiene.

An attempt was made to form rubber pellets in the same manner as above described but using commercially available polyethylene instead of 1,2-polybutadiene. However, polyethylene exhibited such poor solubility that it failed to produce a coating layer.

EXAMPLE 2

The uncoated rubber pellets and those coated with the 1,2-polybutadiene having a crystallinity of 25% in Example 1 were separately mixed on a Banbury mixer in accordance with a compounding recipe given in Table 1. The stocks thus prepared were tested for their physical properties in the unvulcanized state after press curing at 145°C for 50 min. The results are shown in the same table.

Table 1

|  | Without coating | Rubber pellet Coated with 1,2-polybutadiene of 25% crystallinity |
|---|---|---|
| Compounding recipe (parts) |  |  |
| Rubber pellets | 137.5 | Ditto |
| Zinc oxide | 3.0 | " |
| Sulfur | 1.75 | " |
| Stearic acid | 1.0 | " |
| Vulcanization accelerator NS (N-tert.-butyl-benzothiazole sulfenamide) | 1.38 | " |
| HAF carbon black | 68.75 | " |
| Physical properties of unvulcanized rubber |  |  |
| Mooney viscosity (ML₄) | 62.5 | 61.5 |
| Mooney scorch |  |  |
| t₅ (min. sec.) | 50'43" | 52'13" |
| t_Δ30 (min. sec.) | 10'55" | 10'38" |
| Vulcanizing rate (Oscillating disc rheometer) |  |  |
| T₉₀ | 38'24" | 38'00" |
| T₉₀-T₁₀ | 20'00" | 19'36" |
| Physical properties of vulcanized rubber |  |  |
| 300% modulus (kg/cm²) | 130 | 124 |
| Tensile strength (kg/cm²) | 202 | 201 |
| Elongation (%) | 420 | 430 |
| Hardness (JIS Hs) | 61 | 60 |
| Tear strength (kg/cm) | 52 | 53 |
| Crack growth (crack length in mm) |  |  |
| 5000 times | 4.6 | 4.7 |
| 10000 " | 6.8 | 6.8 |
| 30000 " | 12.7 | 12.8 |
| Remarks | Comparative example | Example of invention |

In this example it is ascertained that 1,2-polybutadiene has no adverse effect upon the physical properties of the rubber.

EXAMPLE 3

Polybutadiene rubber (Japan Synthetic rubber's "JSR BR 01") and 1,2-polybutadiene having a 1,2-addition unit content of 91%, crystallinity of 25%, and intrinsic viscosity $[\eta]_{toluene}^{30°C}$ of 1.3 dl/g were used. On an ordinary coating die, the polybutadiene rubber was coated to form spherical rubber pellets about 6 mm in diameter. Upon analysis, the pellets were found to have a coating layer about 100 $\mu$ in thickness and contain 10% by weight 1,2-polybutadiene on the basis of the rubber weight.

The rubber pellets were packed in bags, stacked up to a height of 2 meters, and allowed to stand for 10 days. Then, the pellets were taken out and examined for any evidence of mutual adhesion. Aside from some with partial deformation, most of the pellets maintained the spherical shape they had acquired immediately after the manufacture and exhibited excellent fluidity.

Using commercially available polyethylene, rubber pellets containing about 5% by weight polyethylene were formed in the same manner as described above.

The 1,2-polybutadiene-coated rubber pellets, the polyethylene-coated ones, and polybutadiene rubber pellets for the comparison purpose, were separately milled on a Banbury mixer in accordance with the recipes given in Table 2. The compounded rubber thus obtianed were tested for their physical properties in the unvulcanized state and after press curing at 145°C for 50 min. The results are also tabulated.

Table 2

|  | 1,2-poly-buta-diene | Coating layer Poly-ethy-lene | None |
|---|---|---|---|
| Compounding recipe (parts) |  |  | (Poly-buta-diene only) |
| Rubber pellets | 100 | 100 | 100 |
| Zinc oxide | 3.0 | Ditto | Ditto |
| Sulfur | 1.5 | '' | '' |
| Vulcanization accelerator NS (N-tert.-butyl-benzothiazole sulfenamide) | 0.9 | '' | '' |
| HAF carbon black | 60 | '' | '' |
| Extender oil (Naphthenic type) | 15 | '' | '' |
| Physical properties of unvulcanized rubber |  |  |  |
| Mooney viscosity (ML$_4$) | 73 | 72 | 74.5 |
| Mooney scorch |  |  |  |
| t$_5$ (min. sec.) | 46'08'' | 43'08'' | 45'43'' |
| t$_{\Delta 30}$ (min. sec.) | 5'25'' | 5'16'' | 5'23'' |
| Vulcanization rate (Oscillating disc rheometer) |  |  |  |
| T$_{90}$ (min. sec.) | 26'48'' | 26'48'' | 27'12'' |
| T$_{90}$-T$_{10}$ (min. sec.) | 11'24'' | 10'48'' | 11'00'' |
| Physical properties of vulcanized rubber |  |  |  |
| 300% modulus (kg/cm$^2$) | 110 | 107 | 105 |
| Tensile strength (kg/cm$^2$) | 167 | 165 | 167 |
| Elongation (%) | 400 | 410 | 410 |
| Hardness (JIS Hs) | 67 | 65 | 64 |
| Tear strength (kg/cm) | 58 | 48 | 53 |
| Crack growth (crack length in mm) |  |  |  |
| 5000 times | 6.5 | 7.2 | 7.1 |
| 10000 '' | 7.1 | 12.0 | 8.7 |
| 50000 '' | 7.5 | 14.3 | 10.7 |
| Remarks | Example of invention | Comparative example |  |

From these results it will be seen that, cured or not, the rubber based on the 1,2-polybutadiene-coated rubber pellets properties comparable to or better than those of the rubber based on uncoated polybutadiene rubber. It is also clear that the polyethylene-coated rubber pellets give a product which is inferior particularly in tearing strength and crack growth to the rubber based on uncoated polybutadiene rubber.

EXAMPLE 4

In accordance with the same manner as used in Example 3, the polyethylene coated rubber pellets and the 1,2-polybutadiene coated rubber pellets were produced by using EPDM (propylene content 45%, iodine value 13, dienemonomer: 5-ethylidene-2-norbornane) as the core material, and said EPDM rubber pellets were prepared for comparison purpose. Then said rubber pellets were separately milled on a Banbury mixer in accordance with the recipes given in Table 3. The compound rubbers thus obtained were tested for their properties in unvulcanized state and after press curing at 160°C for 30 min. The results are shown in Table 4.

Table 3

|  | 1,2-poly-buta-diene | Coating layer Poly-ethy-lene | None |
|---|---|---|---|
| Compounding recipe (parts) |  |  | (Poly-buta-diene only) |
| Rubber pellets | 100 | 100 | 100 |
| HAF carbon black | 67.5 | Ditto | Ditto |
| Extender oil (Naphthenic type) | 35 | '' | '' |
| Zinc oxide | 5 | '' | '' |
| Stearic acid | 1 | '' | '' |
| Vulcanization accelerator TS (Tetramethyl thiuram monosulfide) | 1.5 | '' | '' |
| Vulcanization accelerator M (Mercapto benzothiazole) | 0.5 | '' | '' |
| Sulfur | 1.5 | '' | '' |
| Remarks | Example of invention | Comparative examples |  |

Table 4

|  | 1,2-poly-buta-diene | Coating layer Poly-ethy-lene | None |
|---|---|---|---|
| Physical properties of unvulcanized rubber |  |  |  |
| Mooney viscosity (ML 100°C 1 + 4) | 85 | 84 | 83 |
| Mooney scorch (125°C) |  |  |  |
| t$_5$ (min. sec.) | 19'00'' | 20'18'' | 20'06'' |
| t$_{\Delta 30}$ (min. sec.) | 9'18'' | 9'23'' | 9'30'' |
| Vulcanization rate (Oscillating disc rheometer 160°C) |  |  |  |
| T$_{90}$ (min. sec.) | 12'00'' | 12'06'' | 12'00'' |
| T$_{90}$-T$_{10}$ (min. sec.) | 6'42'' | 7'00'' | 7'00'' |

Table 4-continued

| | Coating layer | | |
|---|---|---|---|
| | 1,2-poly-butadiene | Poly-ethylene | None |
| Physical properties of vulcanized rubber | | | |
| 300% modulus (kg/cm²) | 173 | 167 | 166 |
| Tensile strength (kg/cm²) | 200 | 200 | 203 |
| Elongation (%) | 360 | 370 | 370 |
| Hardness (JIS Hs) | 73 | 71 | 70 |
| Tension set (%) (JIS) | 4 | 6 | 4 |
| Compression set (%) (JIS) | 22 | 24 | 22 |
| Heat built-up* (°C) | 25.0 | 27.5 | 24.5 |
| Remarks | Example of invention | Comparative examples | |

From these results it will be seen that, cured or not, the rubber based on the 1,2-polybutadiene-coated rubber pellets have physical properties comparable to or better than those of the rubber based on uncoated EPDM. It is also clear that the polyethylene-coated rubber pellets give a product inferior particularly in Tension set, Compression set and Heat build up, as a result of penetration of the crystals of polyethylene to the EPDM.

We claim:

1. Pelletized unvulcanized rubbery polymer comprising pellet cores of unvulcanized rubbery polymer and a coating layer formed thereon, said coating layer consisting of a 1,2-polybutadiene having a 1,2-addition unit content of not less than 70%, crystallinity of not less than 15%, and intrinsic viscosity $[\eta]$, as measured in toluene at 30°C, of not less than 0.7 dl/g.

2. Pelletized unvulcanized rubbery polymer according to claim 1 wherein the unvulcanized rubbery polymer is at least a member selected from the group consisting of natural rubber, styrene-butadiene rubber, acrylonitrile-butadiene rubber, polybutadiene rubber, polyisoprene rubber, polychloroprene rubber, butyl rubber, and ethylene-propylenediene terpolymer rubber.

3. Pelletized unvulcanized rubbery polymer according to claim 1 wherein the 1,2-addition unit content is not less than 85%.

4. Pelletized unvulcanized rubbery polymer according to claim 1 wherein the crystallinity is between 20 and 35%.

5. Pelletized unvulcanized rubbery polymer according to claim 1 wherein the intrinsic viscosity $[\eta]$ is not less than 1.0 dl/g.

6. Pelletized unvulcanized rubbery polymer according to claim 1 wherein said 1,2-polybutadiene has a 1,2-addition unit content of not less than 85%, a crystallinity of not less than 15%, and an intrinsic viscosity $[\eta]$ of not less than 1.0 dl/g.

7. Pelletized unvulcanized rubbery polymer according to claim 1 wherein at least one conventional compounding ingredient selected from the group consisting of reinforcing agents, fillers, extender oils, pigments, vulcanizing agents, vulcanization accelerators, vulcanization activators, antioxidants, perfumes, and softeners is added to the 1,2-polybutadiene or the unvulcanized rubbery polymer.

8. Pelletized unvulcanized polymer according to claim 1 wherein the pellets of unvulcanized rubbery polymer are in the form of pellets ranging in diameter from 0.1 to 30 mm.

9. Pelletized unvulcanized rubbery polymer according to claim 1 wherein the coating layer has a thickness of 3 to 200 µ.

* * * * *